(12) United States Patent
Schwendinger et al.

(10) Patent No.: US 7,159,789 B2
(45) Date of Patent: Jan. 9, 2007

(54) THERMOSTAT WITH MECHANICAL USER INTERFACE

(75) Inventors: Paul G. Schwendinger, St. Louis Park, MN (US); Jason L. Ableitner, Hopkins, MN (US); James Gray, Carluke (GB); Tim M. Redmann, Carver, MN (US)

(73) Assignee: Honeywell International Inc., Morristown, NJ (US)

( * ) Notice: Subject to any disclaimer, the term of this patent is extended or adjusted under 35 U.S.C. 154(b) by 210 days.

(21) Appl. No.: 10/873,562

(22) Filed: Jun. 22, 2004

(65) Prior Publication Data

US 2005/0279840 A1 Dec. 22, 2005

(51) Int. Cl.
*F24F 11/53* (2006.01)
*G05D 23/00* (2006.01)
*G05D 23/12* (2006.01)

(52) U.S. Cl. .................. 236/1 C; 236/47; 236/78 D; 236/94; 388/824

(58) Field of Classification Search ............... 236/1 C, 236/47, 78 D, 94; 388/824
See application file for complete search history.

(56) References Cited

U.S. PATENT DOCUMENTS

| | | |
|---|---|---|
| 2,225,080 A | 12/1940 | Newman |
| D136,848 S | 12/1943 | Dreyfuss |
| D136,850 S | 12/1943 | Dreyfuss |
| D136,852 S | 12/1943 | Dreyfuss |
| 2,394,920 A | 2/1946 | Kronmiller |
| D176,657 S | 1/1956 | Dreyfuss |
| 2,729,719 A | 1/1956 | Kronmiller |
| D179,069 S | 10/1956 | Dreyfuss |
| D180,517 S | 6/1957 | Hose |
| D183,121 S | 7/1958 | Dreyfuss |
| D183,164 S | 7/1958 | Dreyfuss |
| D189,368 S | 11/1960 | Baak |
| D190,050 S | 4/1961 | Duncan |
| D197,352 S | 1/1964 | Dreyfuss |
| 3,599,006 A | 8/1971 | Harris |
| 4,079,366 A | 3/1978 | Wong |
| D248,838 S | 8/1978 | Pasquarette et al. |
| 4,174,807 A | 11/1979 | Smith et al. |
| D254,052 S | 1/1980 | Wolfe |
| 4,206,872 A | 6/1980 | Levine |
| 4,223,291 A | 9/1980 | Teichert |
| 4,252,270 A * | 2/1981 | Taylor et al. .................. 236/47 |
| 4,264,034 A | 4/1981 | Hyltin et al. |
| 4,298,946 A | 11/1981 | Hartsell et al. |

(Continued)

OTHER PUBLICATIONS

Carrier, "Thermostats: Carrier HVAC Parts," 52 pages, printed Oct. 14, 2003, http:///www.carrierhvacparts.com/Merchant2/merchant.mv.

(Continued)

*Primary Examiner*—Marc Norman

(57) ABSTRACT

A thermostat having a thermostat housing and a rotatable selector disposed on the thermostat housing. The rotatable selector adapted to have a range of rotatable positions, where a desired parameter value is identified by the position of the rotatable selector along the range of rotatable positions. The rotatable selector rotates about a rotation axis. A non-rotating member or element, which may at least partially overlap the rotatable selector, may be fixed relative to the thermostat housing via one or more support member(s). The one or more support member(s) may be laterally displaced relative to the rotation axis of the rotatable selector. The non-rotatable member or element may include, for example, a display, a button, an indicator light, a noise making device, a logo, a temperature indicator, and/or any other suitable device or component, as desired.

30 Claims, 11 Drawing Sheets

U.S. PATENT DOCUMENTS

| | | | |
|---|---|---|---|
| 4,308,991 A | 1/1982 | Peinetti et al. | |
| 4,337,822 A | 7/1982 | Hyltin et al. | |
| 4,382,544 A | 5/1983 | Stewart | |
| 4,386,649 A | 6/1983 | Hines et al. | |
| 4,388,692 A | 6/1983 | Jones et al. | |
| 4,414,520 A | 11/1983 | Ruuth | |
| 4,420,736 A * | 12/1983 | Krueger | 337/340 |
| 4,431,134 A | 2/1984 | Hendricks et al. | |
| 4,442,972 A | 4/1984 | Sahay et al. | |
| 4,446,913 A | 5/1984 | Krocker | |
| 4,449,832 A | 5/1984 | Kammerer | |
| 4,456,169 A | 6/1984 | Martin | |
| 4,479,604 A | 10/1984 | Didner | |
| D276,731 S | 12/1984 | Steiner | |
| 4,606,401 A | 8/1986 | Levine et al. | |
| 4,621,336 A | 11/1986 | Brown | |
| D288,670 S | 3/1987 | Steiner | |
| 4,646,964 A | 3/1987 | Parker et al. | |
| 4,653,708 A * | 3/1987 | Rich | 248/27.1 |
| 4,667,068 A | 5/1987 | Cummings | |
| D290,235 S | 6/1987 | Odom, Jr. et al. | |
| 4,669,654 A | 6/1987 | Levine et al. | |
| 4,685,614 A | 8/1987 | Levine | |
| 4,717,333 A | 1/1988 | Carignan | |
| 4,725,001 A | 2/1988 | Carney et al. | |
| 4,730,110 A | 3/1988 | Spaulding | |
| 4,751,961 A | 6/1988 | Levine et al. | |
| 4,837,731 A | 6/1989 | Levine et al. | |
| 4,846,400 A | 7/1989 | Crouse | |
| 4,881,686 A | 11/1989 | Mehta | |
| 4,910,503 A | 3/1990 | Brodsky | |
| 4,912,939 A | 4/1990 | Obermann et al. | |
| 4,918,439 A | 4/1990 | Wozniak et al. | |
| 4,948,040 A | 8/1990 | Kobayashi et al. | |
| 4,992,779 A | 2/1991 | Sugino et al. | |
| 4,997,029 A | 3/1991 | Otsuka et al. | |
| 5,005,365 A | 4/1991 | Lynch | |
| 5,012,973 A | 5/1991 | Dick et al. | |
| 5,038,851 A | 8/1991 | Mehta | |
| 5,065,813 A | 11/1991 | Berkeley et al. | |
| 5,088,645 A | 2/1992 | Bell | |
| 5,107,918 A | 4/1992 | McFarlane et al. | |
| 5,148,979 A | 9/1992 | Brueton | |
| 5,161,606 A | 11/1992 | Berkeley et al. | |
| 5,181,653 A | 1/1993 | Foster et al. | |
| 5,194,842 A | 3/1993 | Lau et al. | |
| 5,211,332 A | 5/1993 | Adams | |
| 5,230,482 A | 7/1993 | Ratz et al. | |
| 5,246,649 A | 9/1993 | Mattei et al. | |
| 5,251,813 A | 10/1993 | Kniepkamp | |
| 5,259,445 A | 11/1993 | Pratt et al. | |
| 5,303,612 A | 4/1994 | Odom et al. | |
| D347,584 S | 6/1994 | Vogelpohl | |
| 5,329,991 A | 7/1994 | Mehta et al. | |
| 5,348,078 A | 9/1994 | Dushane et al. | |
| 5,482,209 A | 1/1996 | Cochran et al. | |
| 5,526,422 A | 6/1996 | Keen | |
| 5,537,106 A | 7/1996 | Mitsuhashi | |
| 5,542,279 A | 8/1996 | Erdman et al. | |
| 5,566,879 A | 10/1996 | Longtin | |
| 5,570,837 A | 11/1996 | Brown et al. | |
| 5,573,850 A | 11/1996 | Cunningham et al. | |
| 5,673,850 A | 10/1997 | Uptegraph | |
| D390,482 S | 2/1998 | Pasquarette | |
| 5,718,121 A | 2/1998 | Edwards et al. | |
| 5,771,594 A | 6/1998 | Feichtinger | |
| 5,782,296 A | 7/1998 | Mehta | |
| 5,816,491 A | 10/1998 | Berkeley et al. | |
| 5,873,519 A | 2/1999 | Beilfuss | |
| 5,901,183 A | 5/1999 | Garin et al. | |
| 5,902,183 A | 5/1999 | DSouza | |
| 5,937,942 A | 8/1999 | Bias et al. | |
| 5,943,917 A | 8/1999 | Truong et al. | |
| 6,032,867 A | 3/2000 | Dushane et al. | |
| 6,196,467 B1 | 3/2001 | Dushane et al. | |
| 6,208,331 B1 | 3/2001 | Singh et al. | |
| 6,315,211 B1 | 11/2001 | Sartain et al. | |
| 6,318,639 B1 | 11/2001 | Toth | |
| 6,351,693 B1 | 2/2002 | Monie et al. | |
| 6,353,429 B1 | 3/2002 | Long | |
| 6,449,533 B1 | 9/2002 | Mueller et al. | |
| 6,502,758 B1 | 1/2003 | Cottrell | |
| 6,518,682 B1 | 2/2003 | Weaver et al. | |
| 6,518,957 B1 | 2/2003 | Lehtinen et al. | |
| 6,525,675 B1 | 2/2003 | Rodi | |
| D471,825 S | 3/2003 | Peabody | |
| 6,542,088 B1 | 4/2003 | Bielski et al. | |
| 6,581,846 B1 | 6/2003 | Rosen | |
| 6,595,430 B1 | 7/2003 | Shah | |
| 6,741,158 B1 | 5/2004 | Engler et al. | |
| 6,927,348 B1 | 8/2005 | Schmidt et al. | |
| 2002/0005435 A1 | 1/2002 | Cottrell | |
| 2002/0063680 A1 | 5/2002 | Lou et al. | |
| 2002/0078761 A1 | 6/2002 | Meyer | |
| 2002/0145544 A1 | 10/2002 | Rodi | |
| 2002/0148317 A1 | 10/2002 | Onodera | |
| 2003/0034897 A1 | 2/2003 | Shamoon et al. | |
| 2003/0034898 A1 | 2/2003 | Shamoon et al. | |
| 2003/0093907 A1 | 5/2003 | Schroter et al. | |
| 2003/0112157 A1 | 6/2003 | Strasser | |
| 2003/0121652 A1 | 7/2003 | Carey et al. | |
| 2003/0142121 A1 | 7/2003 | Rosen | |
| 2003/0209411 A1 | 11/2003 | McGrath, Jr. et al. | |

OTHER PUBLICATIONS

Ritetemp, "The RiteTemp Support Site—8099 Technical Support Page," 1 page, printed Oct. 14, 2003, http:///www.ritetemp-thermostats.com/8099.html.

Ritetemp, "The RiteTemp Support Site—What Thermostat," 1 page, printed Oct. 14, 2003, http://www.ritetemp-thermostats.com/What_Thermostat.html.

Ritetemp, "Install Guide 8095," 7 pages, prior to filing date of present application.

Ritetemp, "Install Guide 8099," 8 pages, prior to filing date of present application.

White-Rodgers, "Comfort-Set 90 Series Thermostat," Manual, pp. 1-24, printed prior to Mar. 1, 2004.

White-Rodgers, "Comfort-Set III Thermostat," Manual, pp. 1-44, printed prior to Mar. 1, 2004.

White-Rodgers, 1F80-240 "(for Heating Only Systems) Programmable Electronic Digital Thermostat," Installation and Operation Instructions, 8 pages, printed prior to Mar. 1, 2004.

White-Rodgers, 1F80-241 "Programmable Electronic Digital Thermostat," Installation and Operation Instructions, 6 pages, printed prior to Mar. 1, 2004.

White-Rodgers, 1F80-261 "Programmable Electronic Digital Thermostat," Installation and Operation Instructions, 8 pages, printed prior to Mar. 1, 2004.

White-Rodgers, 1F81-261 "Programmable Electronic Digital Multi-Stage Thermostat," Installation and Operation Instructions, 8 pages, printed prior to Mar. 1, 2004.

White-Rodgers, 1F82-261 "Programmable Electronic Digital Heat Pump Thermostat," Installation and Operation Instructions, 8 pages, printed prior to Mar. 1, 2004.

www.honeywell.com/yourhome/, "Comfort Energy and Health Solutions," Honeywell website, 2 pages, 2002.

www.icmcontrols.com, Simplecomfort, SC3000 Single Stage Heat/Single Stage Cool or Single Stage Heat Pump/Manual Changeover, 1 page, printed prior to Mar. 1, 2004.

www.icmcontrols.com, Simplecomfort, SC3001 Single Stage Heat/Single Stage Cool or Single Stage Heat Pump/Manual Changeover, 1 page, printed prior to Mar. 1, 2004.

www.icmcontrols.com, Simplecomfort, SC3006 Single Stage Heat/ Single Stage Cool or Single Stage Heat Pump/Auto Changeover, 1 page, printed prior to Mar. 1, 2004.
www.icmcontrols.com, Simplecomfort, SC3201 2 Stage Heat Pump Manual Changeover, 1 page, printed prior to Mar. 1, 2004.
www.icmcontrols.com, Simplecomfort, SC3801 2 Stage Heat/2 Stage Cool 2 Stage Heat Pump/Audio Changeover, 1 page, printed prior to Mar. 1, 2004.
Bourns, ECW—"Digital Contacting Encoder," 3 pages, Apr. 2003.
Braeburn, "Model 3000 Digital Heat/Cool Non-Programmable," 2 pages, printed Dec. 9, 2003, http://www.braebouronline.com/model3000.html.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Guide, pp. 1-8 pages, 1999.
Carrier, "Thermidistat Control, Installation, Start-Up, and Operating Instructions," pp. 1-12, Aug. 1999.
CorAccess, "Companion 6," User Guide, pp. 1-20, Jun. 17, 2002.
Eco-Stat Website, http://www.ecomfg.net, 4 pages, printed Sep. 30, 2003 and Oct. 1, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat" 3 pages, printed Jun. 17, 2004.
http://www.thermostatsales.com, Robertshaw, "9720 Deluxe Programmable Thermostat" 3 pages, printed Jun. 17, 2004.
Honeywell, "T87F Thermostats," pp. 1-8, 2002.
Honeywell, "T8141A Electronic Heat Pump Thermostat," Installation Instructions, 8 pages, 1995.
Honeywell, "T8141A Electronic Heat Pump Thermostats," Product Data, 8 pages, 1996.
Honeywell, "T8200 Microelectronic Fuel Saver Thermostat," Owner's Manual, 23 pages, 1984.
Honeywell, "T8200A Microelectronic Chronotherm Fuel Saver Thermostat," 20 pages, 1986.
Honeywell, "Modulating Room Thermostat," Dutch User's Manual and English translation of the manual, 13 pages each, Mar. 2002.
Honeywell, "Thermostat Subbases Q539A,B,C,F,G,H,J,P," pp. 1-11, 1989.
Hunter, "44200/44250," Owner's Manual, 32 pages, printed prior to Mar. 1, 2004.
Hunter, "44300/44350," Owner's Manual, 35 pages, printed prior to Mar. 1, 2004.
Hunter, "Auto Saver 550", Owner's Manual Model 44550, 44 pages, printed prior to Mar. 1, 2004.
Invensys, "9700i 9701i 9715i 9720i Deluxe Programmable Thermostats," User's Manual, p. 1-28, printed prior to Mar. 1, 2004.
Lux, "511 Series Smart Temp Electronic Thermostat," Owner's Manual, 3 pages, printed prior to Mar. 1, 2004.
Lux, "600 Series Smart Temp Electronic Thermostat," Owner's Manual, 3 pages, printed prior to Mar. 1, 2004.
Lux, "602 Series Multi-Stage Programmable Thermostat," Owner's Manual, 2 pages, printed prior to Mar. 1, 2004.
Lux, "605/2110 Series Programmable Heat Pump Thermostat," Owner's Manual, 3 pages, printed prior to Mar. 1, 2004.
Lux, "700/9000 Series Smart Temp Electronic Thermostat," Owner's Manual, 3 pages, printed prior to Mar. 1, 2004.
Lux, "PSPH521 Series Programmable Heat Pump Thermostat," Owner's Manual, 3 pages, printed prior to Mar. 1, 2004.
Lux, "TX500: Smart Temp 500," http://www.luxproducts.com/thermostats/tx500.htm., 2 pages, printed Dec. 9, 2003.
Lux, "TX500 Series Smart Temp Electronic Thermostat," Owner's Manual, 3 pages, printed prior to Mar. 1, 2004.
Lux, "TX1500 Series Smart Temp Electronic Thermostat," Owner's Manual, 6 pages, printed prior to Mar. 1, 2004.
Lux, "ELV1 Programmable Line Voltage Thermostat," Owner's Manual, 3 pages, printed prior to Mar. 1, 2004.
Metasys, "HVAC PRO for Windows User's Manual," 308 pages, 1998.
Millier, "Using Rotary Encoders as Input Devices," Circuit Cellular, Issue 152, 6 pages, Mar. 2003.
http://www.ritetemp.info/rtMenu_13.html, Rite Temp 8082, 6 pages, printed Jun. 20, 2003.
RE16 Series Mechanical Incremental Rotary Encoder, 3 pages, prior to Mar. 1, 2004.
Totaline, "1 For All programmable Digital Thermostat," Owner's Manual P/N P374-1100FM, 24 pages, Nov. 1998.
Totaline, "1 For All Programmable Digital Thermostat," Owner's Manual P/N P474-1050, 22 pages, Nov. 1998.
Totaline, "1 For All Programmable Digital Thermostat," Owner's Manual P/N P374-1100, 24 pages, Apr. 2001.
Totaline, "Intellistat Combination Temperature and Humidity Control," Owner's Manual P/N P374-1600FM, 26 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Warmly Yours, "Model TH111GFCI-P (120- VAC)," Manual, pp. 1-4, printed prior to Mar. 1, 2004.
White-Rodgers, "Installation Instructions for Heating & Air Conditioning IF72 5/2 Day Programmable Heat Pump Thermostat," 8 pages, printed prior to Mar. 1, 2004.
White-Rodgers, "Installation Instructions for Heating & Air Conditioning IF78 5/2 Day Programmable Thermostat," 7 pages, printed prior to Mar. 1, 2004.

* cited by examiner

THERMOSTAT WITH MECHANICAL USER INTERFACE

BACKGROUND

Thermostats are widely used in dwellings and other temperature-controlled spaces. In many cases, thermostats are mounted on a wall or the like to allow for the measurement and control of the temperature, humidity and/or other environmental parameter within the space. Thermostats come in a variety of shapes and with a variety of functions. Some thermostats are electromechanical in nature, and often use a bimetal coil to sense and control the temperature setting, typically by shifting the angle of a mercury bulb switch. These thermostats typically have a mechanical user interface, such as a rotating knob or the like, to enable the user to establish a temperature set point. More advanced electronic thermostats have built in electronics, often with solid state sensors, to sense and control various environmental parameters within a space. The user interface of many electronic thermostats includes software controlled buttons and/or a display.

It has been found that while electronic thermostats often provide better control, thermostats with a mechanical user interface can often be more intuitive to use for some users. Many users, for example, would be comfortable with a rotating knob that is disposed on a thermostat for setting a desired set point or other parameter. However, to provide increased functionality and/or user feedback, it has been found that locating non-rotating parts such as displays, buttons, indicator lights, noise making devices, logos, temperature indicators, and/or other suitable devices or components near and/or inside the rotating knob or member can be desirable. The present invention provides methods and apparatus for locating a non-rotating part or parts near or inside of a rotating knob or member, while still allowing the rotating knob or member to set and/or control one or more parameters of the thermostat.

SUMMARY

The present invention relates generally to an improved thermostat that includes a rotatable user interface selector. In one illustrative embodiment, the rotatable selector has a range of rotatable positions, wherein a desired parameter value is identified by the position of the rotatable selector along the range of rotatable positions. The rotatable selector may rotate about a rotation axis. A non-rotating member or element, which may at least partially overlap the rotatable selector, may be fixed relative to the thermostat housing via one or more support member(s). The one or more support member(s) may be laterally displaced relative to the rotation axis of the rotatable selector. The non-rotating member or element may include, for example, a display, a button, an indicator light, a noise making device, a logo, a temperature indicator, and/or any other suitable device or component, as desired.

In some embodiments, the rotatable selector includes a shaft, or is attached to a shaft, that extends along the rotation axis. The rotatable selector may be coupled to a mechanical to electrical translator, such as a potentiometer. The mechanical to electrical translator may translate the mechanical position of the rotatable selector to a corresponding electrical signal that can be used by the thermostat.

In some illustrative embodiments, the rotatable selector may include an elongated opening or slot. The elongated opening or slot may, for example, extend in an arc about the rotation axis. The one or more support member(s), which fix the non-rotating member or element relative to the thermostat, may extend through the elongated opening or slot. In some embodiments, as the rotatable selector is rotated about the rotation axis, the one or more support member(s) move along a length of the elongated opening or slot.

In some embodiments, the non-rotating member is adapted to overlap a front and/or back face of the rotatable selector. For example, and in one illustrative embodiment, the non-rotating member overlaps at least a portion of the front face of the rotatable selector, and in some cases, overlaps to an extent that at least a portion of the non-rotating member intersects the rotation axis of the rotatable selector.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
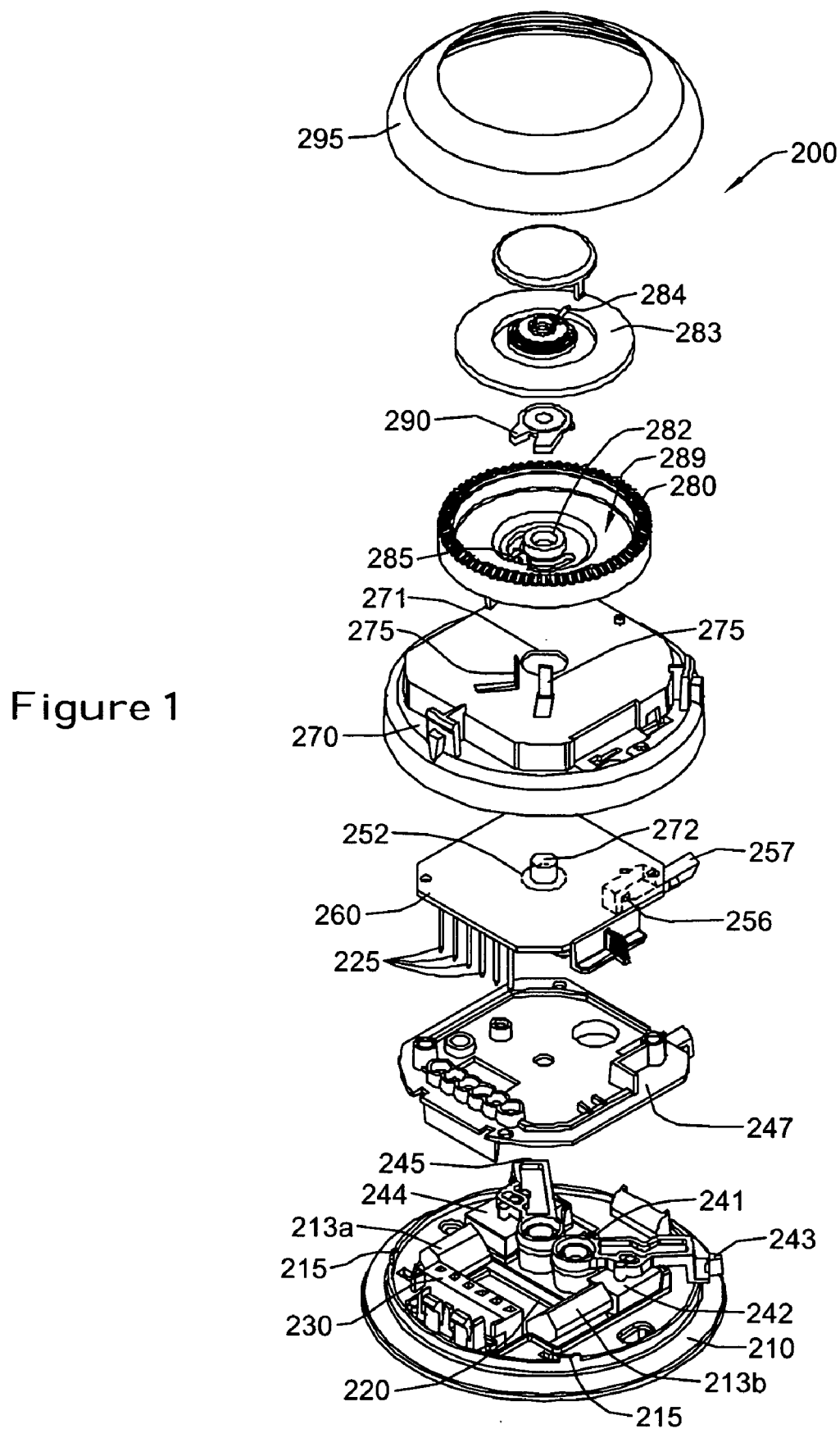
FIG. 1 is a perspective exploded view of an illustrative thermostat in accordance with the present invention.

FIG. 1 is a perspective exploded view of an illustrative thermostat 200 in accordance with the present invention. The illustrative thermostat includes a base plate 210 which is configured to be mounted on a wall by any suitable fastening means such as, for example, screws, nails, adhesive, etc. The illustrative base plate 210 has a circular shape, however the base plate 210 can have any shape, as desired. In an illustrative embodiment, the base plate has a diameter in the range of 8 cm to 12 cm.

The base plate 210 can include a printed circuit board 220. In the embodiment shown, the printed circuit board 220 is affixed to the base plate 210. One or more wires may be used to interconnect a remote HVAC system (e.g. furnace, boiler, air conditioner, humidifier, etc.) to the base plate 210 at terminal blocks 213*a* and 213*b*.

In this illustrative embodiment, a variety of switches are disposed on the base plate 210 and in electrical connection with the printed circuit board 220. A fuel switch 241 is shown located near the center of the base plate 210. The fuel switch 241 can switch between E (electrical) and F (fuel). A FAN ON/AUTOMATIC switch 242 and corresponding lever 243 is shown disposed on the base plate 210. The FAN ON/AUTOMATIC switch 242 can be electrically coupled to the printed circuit board 220. A COOL/OFF/HEAT switch 244 and corresponding lever 245 is shown disposed on the base plate 210. The COOL/OFF/HEAT switch 245 can be electrically coupled to the printed circuit board 220.

The printed circuit board 220 can be electrically coupled to a second printed circuit board 260 by a plurality of pins 225 that are fixed relative to the second printed circuit board 260. The plurality of pins 225 may extend through a PCB shield 247 before sliding into a connector 230 on the first printed circuit board 220.

The second printed circuit board 260 can be disposed adjacent to the base plate 210. In the illustrative embodiment shown, a potentiometer 252 is disposed on (the opposite side shown) and electrically coupled to the second printed circuit board 260. While a potentiometer 252 is shown, it is contemplated that any mechanical to electrical translator may be used. In the illustrative embodiment, the potentiometer 252 is positioned at or near a center of the second printed circuit board 260, but this is not required. In the illustrative embodiment, the potentiometer 252 is coupled to a controller (not shown) on the second printed circuit board 260, which provides one or more control signals to a remote HVAC system.

A temperature sensor, or in the illustrative embodiment, a thermistor (not shown) is disposed on and electrically coupled to the second printed circuit board 260. In one embodiment, the temperature sensor or thermistor can be located near an edge of the second printed circuit board 260, however it is contemplated that the thermistor can be located at any position on or near the second printed circuit board 260, or elsewhere, as desired.

A light source 256 is also shown disposed on and electrically coupled to the second printed circuit board 260. The light source can be, for example, an LED. In the illustrative embodiment, the light source 256 is shown positioned adjacent to a light guide 257. The light guide 257 is shown extending away from the second printed circuit board 260, and may extend through an intermediate housing 270 for viewing by a user of the thermostat, if desired.

The intermediate housing 270 is shown disposed over the second printed circuit board 260 and base plate 210. In the illustrative embodiment, the intermediate housing 270 includes one or more support members 275 that are laterally offset from a center 271 of the intermediate housing 270, and extending up and away from the intermediate housing 270. In one illustrative embodiment, the center 271 of the intermediate housing 270 is disposed along a rotation axis of a rotatable selector 280, but this is not required.

A potentiometer shaft 272 is shown extending from the potentiometer 252 and through the intermediate housing 270. In one embodiment, the potentiometer shaft 272 may be disposed along the rotation axis of the rotatable selector 280, which may or may not correspond or be near the center or centroid of the intermediate housing 270. The rotatable selector 280 can then be disposed about and/or coupled to the potentiometer shaft 272.

The illustrative rotatable selector 280 is shown having a circular shape, however, any suitable shape may be used. In some embodiments, the rotatable selector 280 can include a planar portion 289, and a sleeve 282 disposed along the inner edge of the planar portion 289, if desired. The sleeve 282 is shown extending up and away from the planar portion 289 about the rotation axis of the rotatable selector 280. The sleeve 282 can be configured to engage the potentiometer shaft 272 so that the potentiometer shaft 272 rotates as the rotatable selector 280 rotates. The sleeve 282 may provide additional support to the rotatable selector 280 near the potentiometer shaft 272.

In one illustrative embodiment, the support member 275 (one or more as desired) can extend through an opening or slot in the rotatable selector 280 as shown. In some embodiments, the opening or slot may extend in an arc about the rotation axis of the rotatable selector 280. The opening or slot is shown as an elongated hole that extends through the rotatable selector 280. However, it is contemplated that the opening or slot may be defined by the shape of the rotatable selector 280. That is the opening or slot may extend all the way to an outer or inner perimeter of the rotatable selector 280, if desired.

In the illustrative embodiment, an interface support 290 is fixed to the support member(s) 275. The interface support 290 can overlap the rotatable selector 280, and in some cases, may intersect the rotation axis of the rotatable selector 280. A scale plate 283 is disposed adjacent the planar portion 289 of the rotatable selector 280, and in some cases, may be fixed to the interface support 290. The scale plate 283 can include indicia such as, for example, temperature indicia for both a current temperature and a set point temperature. A current temperature indicator 284 can also be fixed to the interface support 290, and in some cases, can be formed of a bimetal coil. A set point temperature indicator 285 can be fixed to the planar portion 289 of the rotatable selector 280. Thus, in this illustrative embodiment, the rotatable selector 280 and set point temperature indicator 285 may rotate relative to the interface support 290 (and thus the intermediate housing 270 and base plate 210) when the rotatable selector 280 is rotated. The current temperature indicator 284 may be fixed to the interface support 290. An outer housing 295 can be disposed about the intermediate housing 270. The illustrative embodiment shows the outer housing 295 having an annular shape, however the outer cover 295 may have any shape, as desired.

Figure 2:
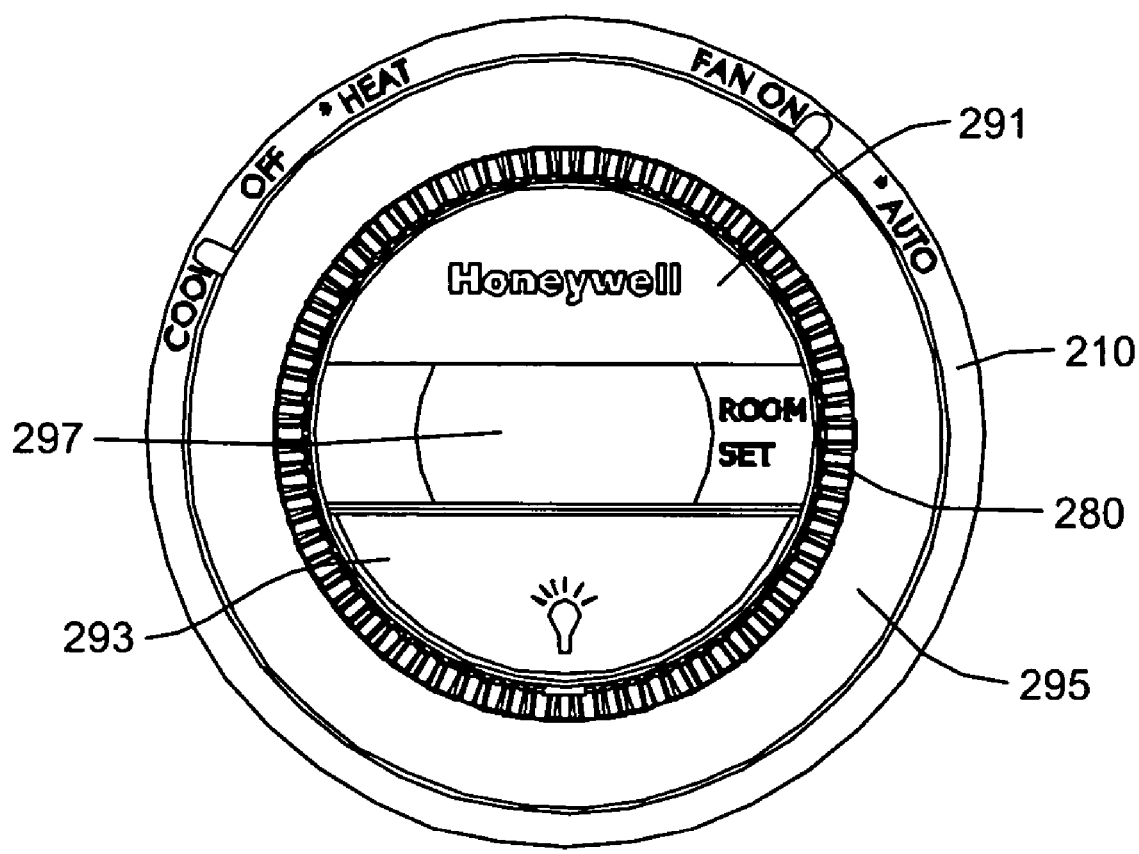
FIG. 2 shows a front perspective view of an illustrative thermostat that includes a display.

In some embodiments, a display (e.g. LCD display), one or more buttons, indicator lights, noise making devices, logos, and/or other devices and/or components may be fixed to the support member(s) 275, if desired, wherein the rotatable selector 280 may rotate relative to these other devices and/or components. For example, FIG. 2 shows an illustrative thermostat that includes a display 297, which is fixed relative to the support member(s) 275, sometimes via the interface support 290, wherein rotatable selector 280 may rotate about the display 297. In some illustrative embodiments, a desired parameter value (e.g. temperature set point) is displayed on the display 297, and in some cases, the desired parameter value that is displayed on the display 297 changes as the rotatable selector 280 is rotated. In some embodiments, the current temperature and/or the temperature set point may be displayed on the display 297, as well as other information as desired. The illustrative thermostat of FIG. 2 also shows a logo region 291 and a back light button 293, both of which may also be fixed relative to the support member(s) 275, wherein rotatable selector 280 may rotate about the logo region 291 and back light button 293.

Figure 3:
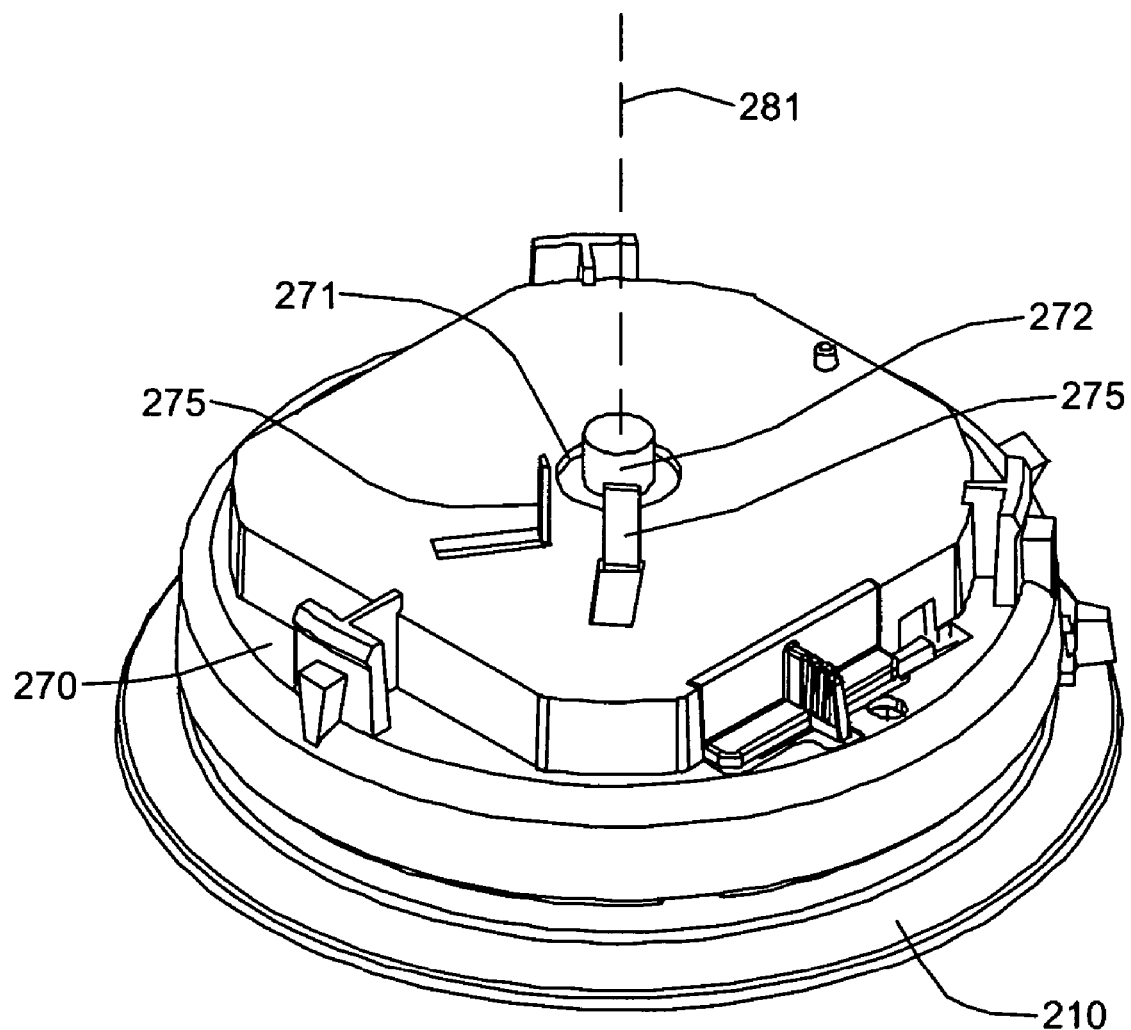
FIG. 3 through FIG. 8 are perspective views of various components of the illustrative thermostat of FIG. 1.

FIG. 3 through FIG. 8 are perspective views of various components of the illustrative thermostat of FIG. 1. Referring to FIG. 3, the intermediate housing 270 is fixed relative to the base housing 210. As noted above, the potentiometer shaft 272 may extend from a potentiometer 252 (FIG. 1) through the intermediate housing 270, as shown. While a potentiometer is used in this illustrative embodiment, it is contemplated that any mechanical to electrical translator may be used to translate the position of the rotatable selector 280 to a corresponding electrical signal that can be used by the thermostat controller (e.g. an encoder or other sensor).

The one or more support members 275 are shown extending up and away from the intermediate housing 270. The one or more support members 275 are laterally offset from the rotation axis 281 of the rotatable selector 280. In some embodiments, one or more of the support members 275 extend orthogonally away from the intermediate housing 270, but this is not required in all embodiments.

Figure 4:
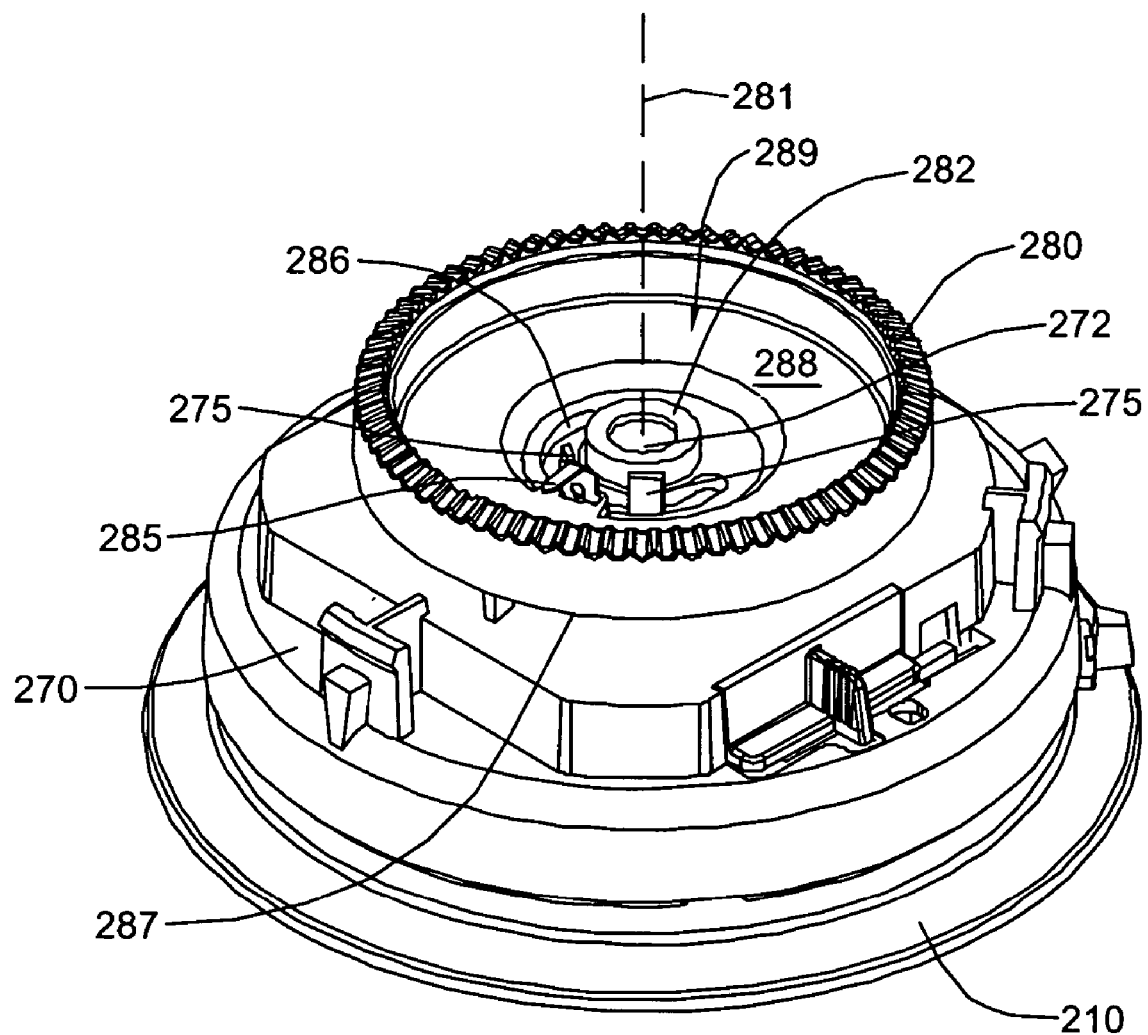

FIG. 4 shows the illustrative embodiment of FIG. 3 with the rotatable selector 280 connected to the potentiometer shaft 272. In the embodiment shown, the rotatable selector 280 has a circular shape, but it is contemplated that rotatable selector 280 may have any suitable shape as desired. As noted above, the rotatable selector 280 has a rotation axis 281 that extend through the sleeve 282. In the illustrative embodiment, the sleeve 282 is coupled to the potentiometer shaft 272. In one embodiment, the potentiometer 252 (FIG. 1) is positioned below the rotatable selector 280 and along the rotation axis 281. The rotation axis 281 may be disposed along the intermediate housing 270 centroid, but this is not required. A set point temperature indicator 285 is shown fixed to the rotatable selector 280. In one embodiment, the rotatable selector 280 and set point temperature indicator 285 rotate together.

A support member aperture, opening or slot 286 is shown extending through the rotatable selector 280. In the illustrative embodiment, the support member aperture 286 extends in an arc about 180 degrees around the rotation axis 281 of the rotatable selector 280, and is laterally offset from the rotation axis 281. The support member aperture, opening or slot 286 can extend any number of degrees about the rotation axis 281, and can be continuous or discontinuous, as desired. In one illustrative embodiment, the support member aperture, opening or slot 286 defines a range of rotatable positions for the rotatable selector 280. The support member 275 may move along the length of the support member aperture, opening, or slot 286, as the rotatable selector 280 is rotated through the range of rotatable positions.

In the illustrative embodiment, the rotatable selector 280 may have a planar portion 289 having a front surface 288 and an opposing back surface 287. Non-rotating elements can at least partially overlap the front or back surface 288 of the rotatable selector 280.

Figure 5:
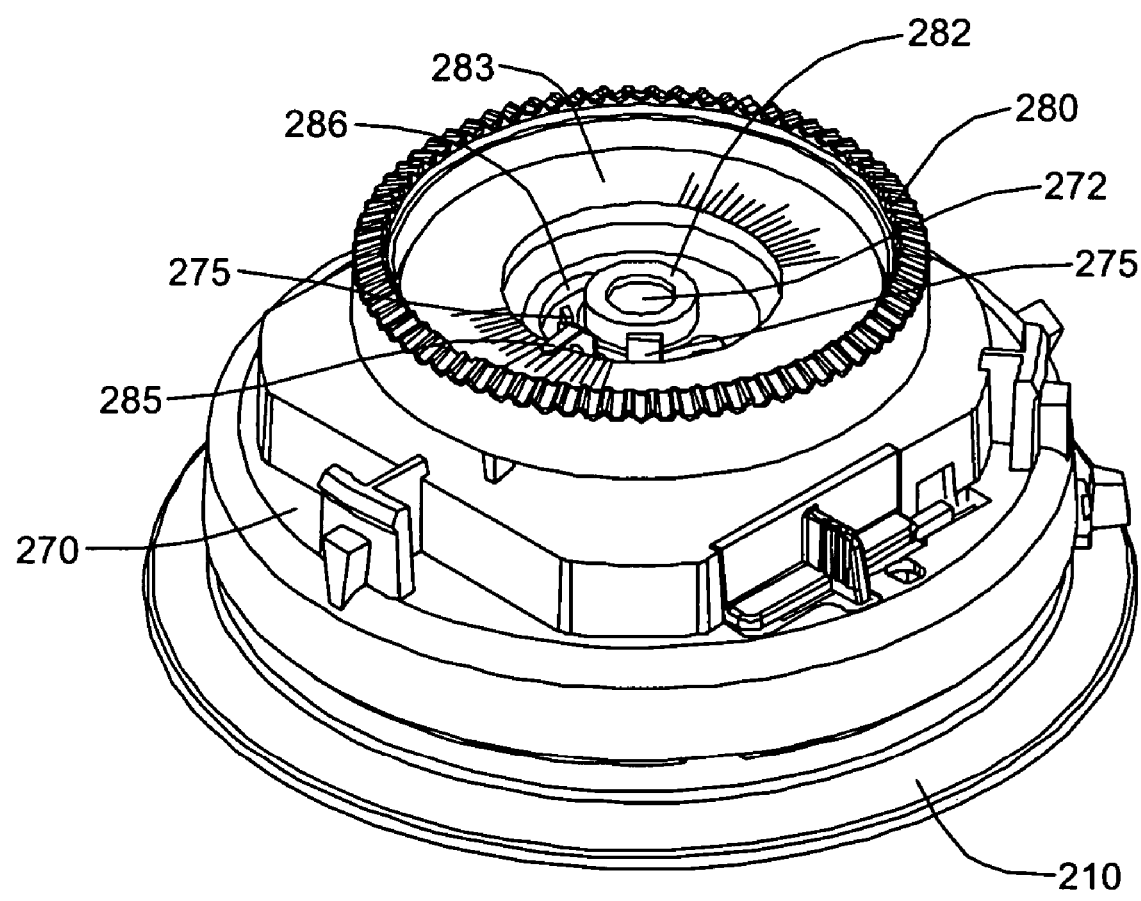
Figure 6:
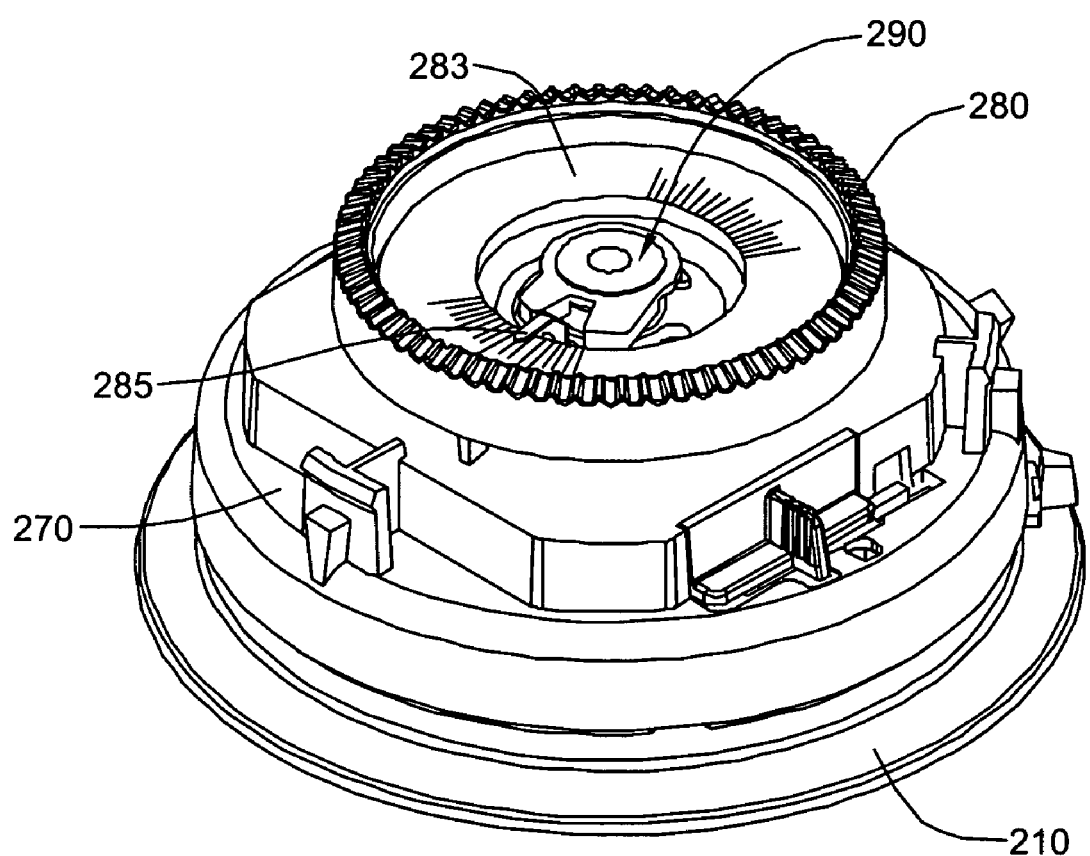

FIG. 5 shows a scale plate 283 disposed on or adjacent to the rotatable selector 280. The scale plate 283 can be fixed to the support member 275 and/or interface support 290 shown in FIG. 6, and thus may not rotate with the rotatable selector 280. Referring to FIG. 6, the interface support 290 may be fixed to the support member 275. In some embodiments, the interface support 290 extends orthogonally from the support member 275, and in some cases, may overlap and intersect the rotation axis 281 of the rotatable selector 280. In one illustrative embodiment, the scale plate 283 is fixed to the interface support 290.

Figure 7:
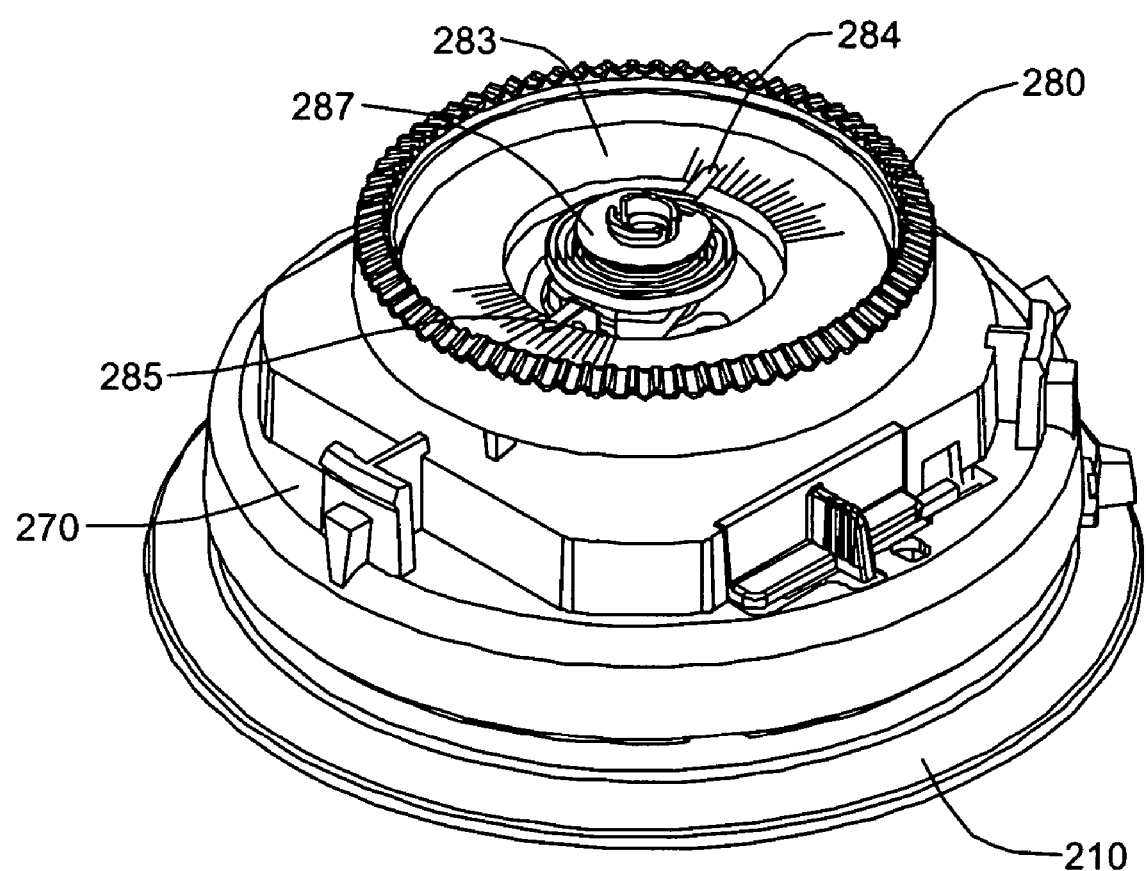
Figure 8:
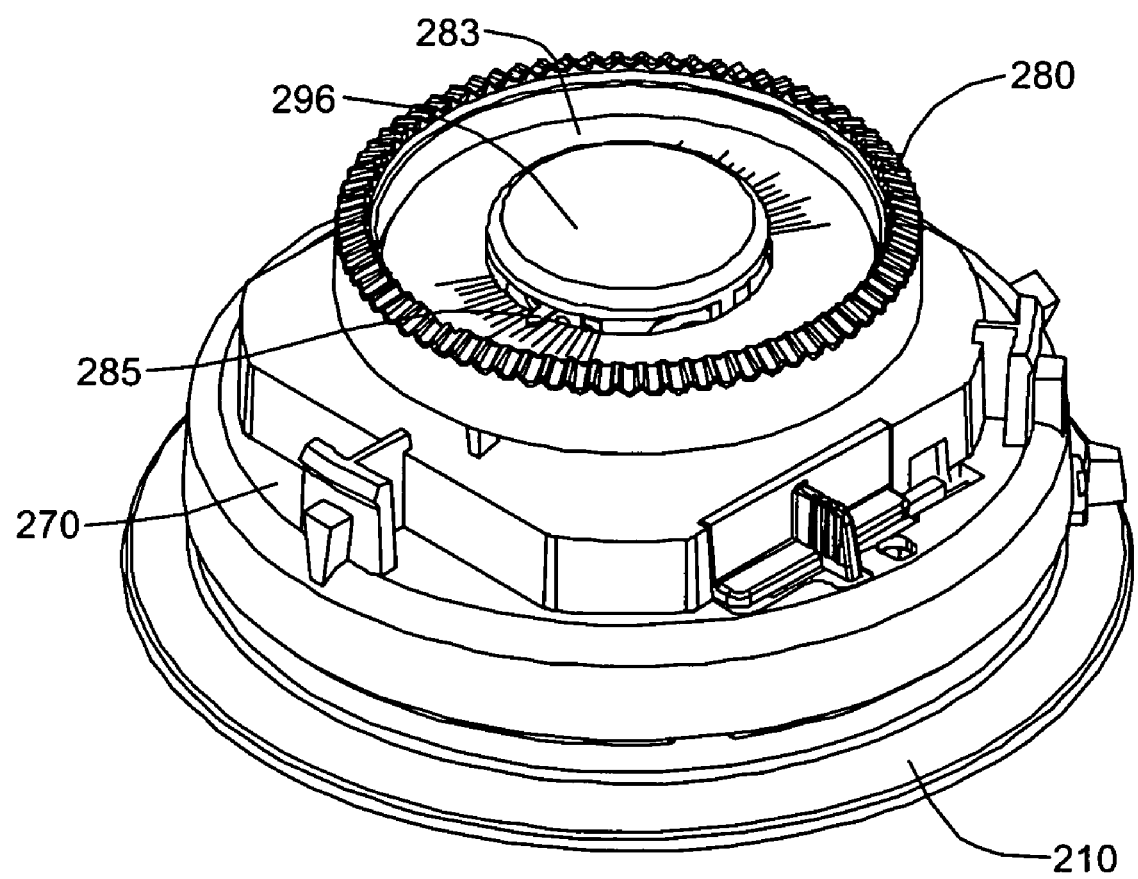

FIG. 7 shows a current temperature indicator 284 fixed to the interface support 290. In the illustrative embodiment shown, the current temperature indicator 284 is formed of a bimetal coil, but this is not required. For example, and as shown in FIG. 2, the temperature indicator can be displayed on a display 297. A monogram support 287 can fix the current temperature indicator 284 to the interface support 290. FIG. 8 shows a monogram logo element 296 disposed over the current temperature indicator 284 and can be fixed to the scale plate 283, monogram support 287, interface support 290, and/or support member 275, as desired. Thus, in at least one illustrative embodiment, the monogram logo element 296, current temperature indicator 284, scale plate 283, monogram support 287, interface support 290, and support member 275 do not rotate with the rotatable selector 280, while the set point temperature indicator 285 does rotate with the rotatable selector 280.

Figure 9:
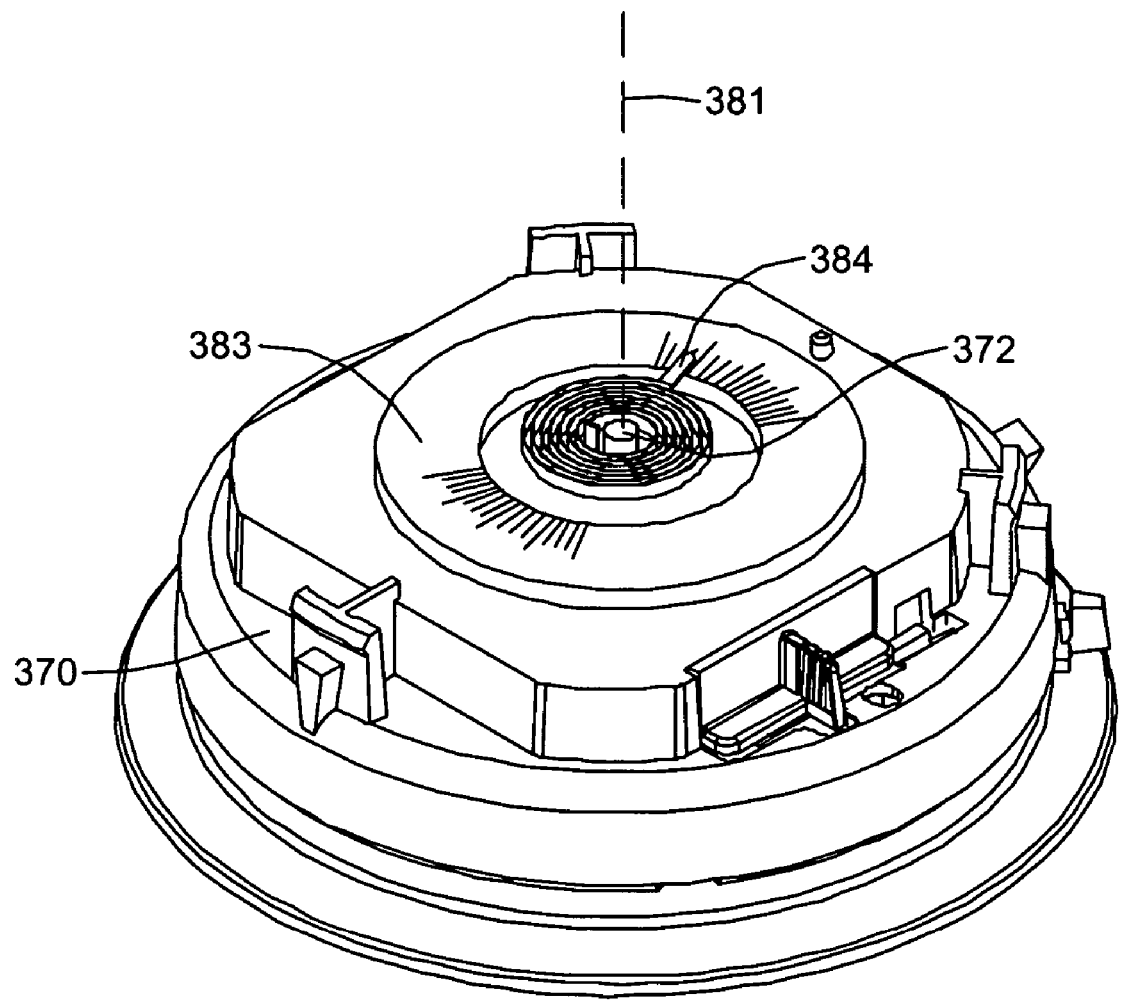
FIG. 9 and FIG. 10 are perspective views of various components of another illustrative thermostat mechanical interface in accordance with the present invention.
Figure 10:
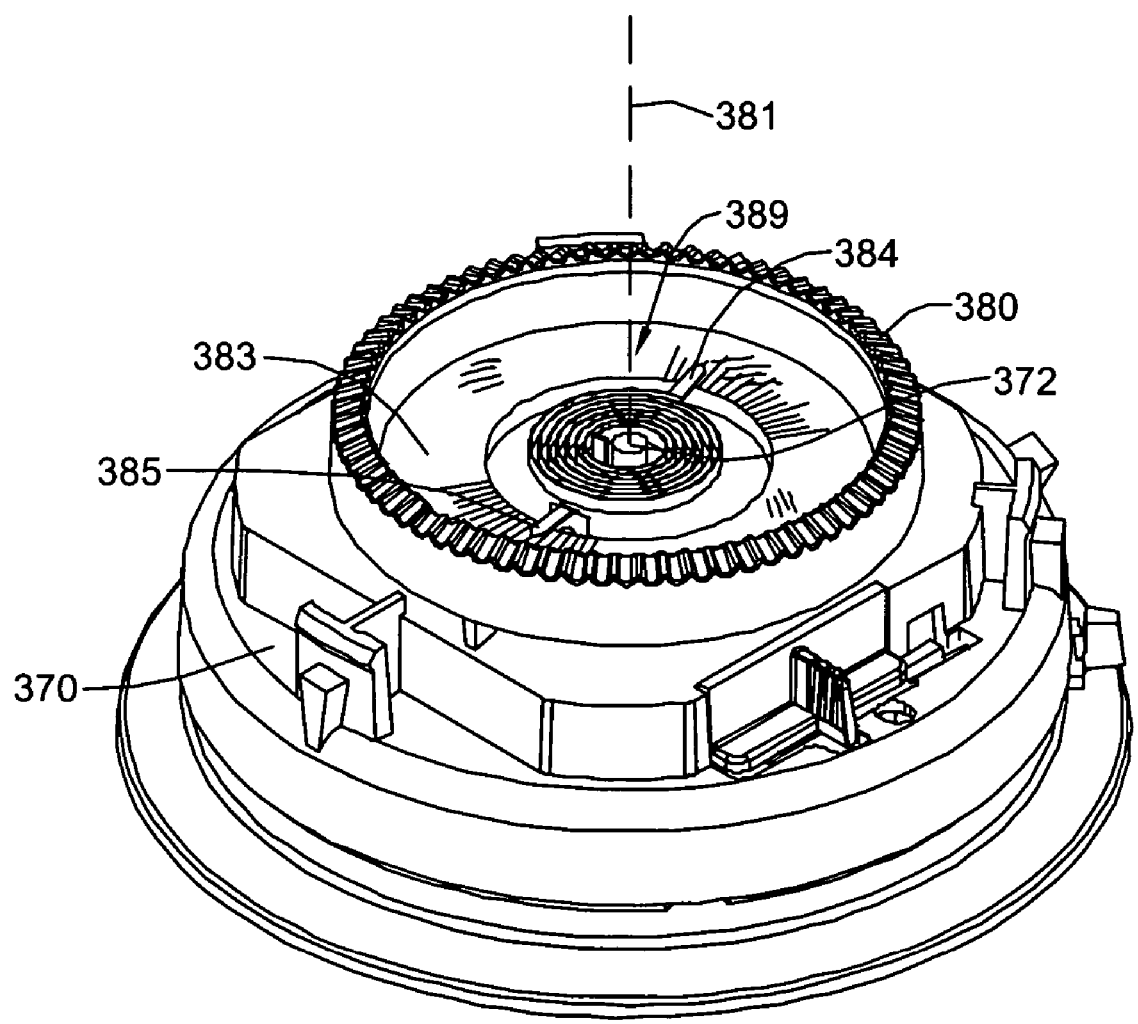

FIG. 9 and FIG. 10 are perspective views of various components of another illustrative thermostat mechanical interface in accordance with the present invention. FIG. 9 shows a scale plate 383 disposed on or adjacent to the intermediate housing 370. A potentiometer shaft 372, or any other suitable mechanical to electrical translator, can be disposed along a rotation axis of the rotatable selector 380 (FIG. 10). The scale plate 383 is shown spaced from the rotation axis of the rotatable selector 380. A current temperature indicator 384 can also be provided, and may also be spaced from the rotation axis 381 of the rotatable selector 380.

FIG. 10 shows a rotatable selector 380 coupled to the potentiometer shaft 372 along the rotation axis 381 of the rotatable selector 380. Like above, and in the illustrative embodiment, the rotatable selector 380 can include a planar portion 389 disposed above and adjacent to the scale plate 383. The planar portion 389 can, for example, be formed of a transparent material that allows a user to view the scale plate 383 through the rotatable selector 380. In another embodiment, the planar portion 389 can have an opening (not shown) that allows a user to view the scale plate 383 through the rotatable selector 380.

Figure 11:
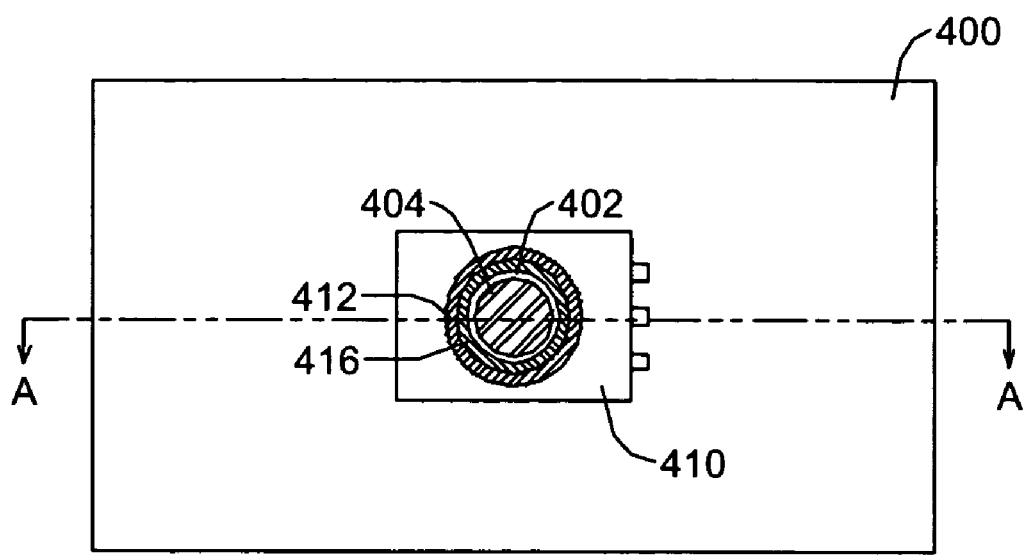
FIG. 11 is a top schematic view of another illustrative embodiment of the present invention, looking down plane B—B of FIG. 12.
Figure 12:
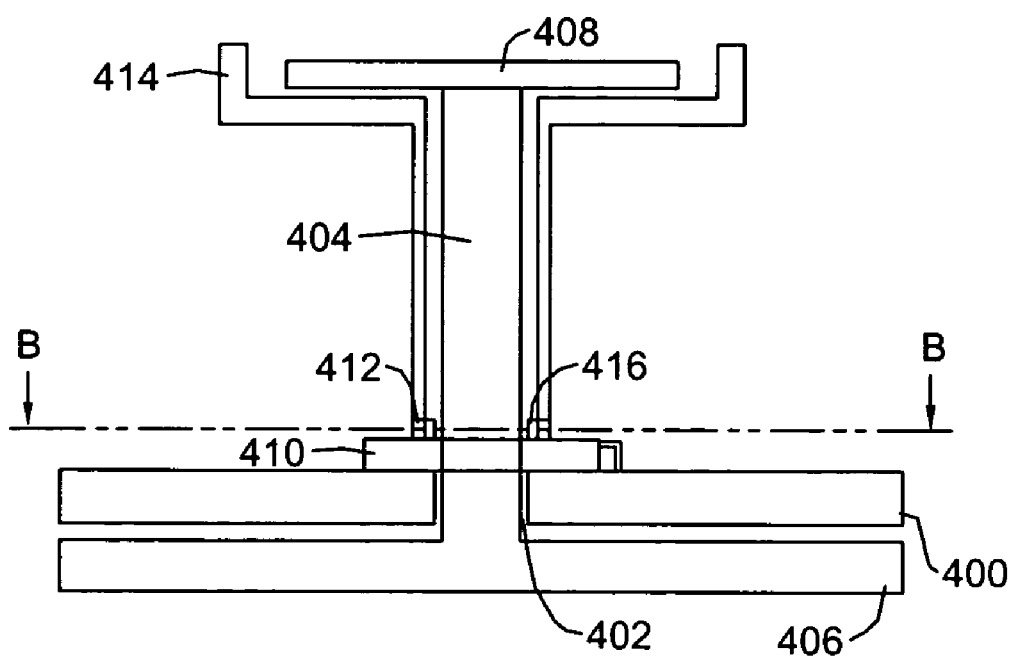
FIG. 12 is a partial cross-sectional side view of the illustrative embodiment of FIG. 11 taken along line A—A of FIG. 11.

FIG. 11 is a top schematic view of another illustrative embodiment of the present invention, looking down plane B—B of FIG. 12. FIG. 12 is a partial cross-sectional side view of the illustrative embodiment of FIG. 11 taken along line A—A of FIG. 11. FIGS. 11–12 show a printed circuit board 400 with an aperture 402 formed therethrough. Extending through the aperture 402 is a support member 404. The support member 404 may extend up from a housing 406, through the aperture 402 in the printed circuit board 400, and may support one or more non-rotating elements 408. The one or more non-rotating elements generally shown at 408 may include, for example, a scale plate, a temperature indicator (e.g. bi-metal coil), a display, a button, an indicator light, a noise making device, a logo, and/or any other suitable device or component, as desired.

In the illustrative embodiment, a potentiometer, encoder or other suitable device 410 that includes an aperture extending therethrough can be fixed relative to the printed circuit board 400, as shown. The aperture in the potentiometer, encoder or other suitable device 410 can be aligned with the aperture 402 in the printed circuit board 400. The potentiometer, encoder or other suitable device 410 may include a rotatable element 412, which may be coupled to a rotatable member 414. The rotatable member 414 may extend around and rotate about the support member 404. In some cases, the potentiometer, encoder or other suitable device 410 may include a non-rotatable element 416 adjacent the rotatable element 412 to provide additional support to the rotatable element 412. Illustrative potentiometers and encoders include, for example, center space rotary potentiometers having model numbers EWVYE, EWVYF, EWVYG, and center space rotary encoders having model number EVQWF, all commercially available from Panasonic Matsushita Electric Corporation of America, Secaucus, N.J.

During use, the rotatable member 414 may be rotated by a user about the support member 404. The support member 404 may support one or more non-rotating elements 408. The potentiometer, encoder or other suitable device 410 may translate the mechanical position of the rotatable member to a corresponding electrical signal, which can then be provided to a controller on the printed circuit board 400, if desired.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A thermostat having a thermostat housing, comprising:
   a rotatable selector having a front face, and further having a range of rotatable positions, wherein a desired parameter value is identified by the position of the rotatable selector along the range of rotatable positions, the rotatable selector being rotatable about a rotation axis;
   a potentiometer coupled to the rotatable selector; and
   a non-rotating element at least partially overlapping the front face of the rotatable selector, the non-rotating element fixed relative to the thermostat housing via one or more support member, the one or more support member being laterally offset relative to the rotation axis of the rotatable selector.

2. A thermostat according to claim 1, wherein the potentiometer is disposed along the rotation axis of the rotatable selector.

3. A thermostat according to claim 1, further comprising a circuit board that is fixed relative to the thermostat housing, and wherein the potentiometer is mounted to the circuit board.

4. A thermostat according to claim 1, wherein the non-rotating element intersects the rotation axis of the rotatable selector.

5. A thermostat according to claim 4, wherein the non-rotating element comprises a scale plate.

6. A thermostat according to claim 5, wherein the scale plate includes a temperature scale.

7. A thermostat according to claim 6, wherein the rotatable selector includes a pointer.

8. A thermostat according to claim 7, wherein the non-rotating element comprises a temperature indicator.

9. A thermostat according to claim 8, wherein the temperature indicator includes a pointer.

10. A thermostat according to claim 9, wherein the temperature indicator includes a bi-metal thermometer.

11. A thermostat according to claim 9, wherein the non-rotating element includes a logo region with a logo provided thereon.

12. A thermostat according to claim 1, further comprising a housing ring having an aperture therein, wherein the aperture is adapted to accept the rotatable selector.

13. A thermostat having a selected temperature set point and a temperature sensor, the temperature sensor providing a temperature indicator and the thermostat providing a control signal that is dependent at least in part on the selected temperature set point and the temperature indicator, the thermostat comprising:
   a thermostat housing;
   a rotatable selector having a front face, and further having a range of rotatable positions, wherein a set point is identified by the position of the rotatable selector along the range of rotatable positions, the rotatable selector rotatable about a rotation axis;
   a potentiometer coupled to the rotatable selector and disposed along the rotation axis of the rotatable selector; and
   a non-rotating element at least partially overlapping the front face of the rotatable selector, the non-rotating element fixed relative to the thermostat housing via one or more support member, the one or more support member being laterally offset relative to the rotation axis of the rotatable selector.

14. A thermostat according to claim 13, wherein the one or more support member extends through an opening or slot in the rotatable selector.

15. A thermostat according to claim 13, wherein the one or more support member extends through an elongated opening in the rotatable selector that extends in an arc about the rotation axis of the rotatable selector.

16. A thermostat according to claim 13 wherein the thermostat housing defines a housing cross-sectional surface area, and wherein the housing cross-sectional surface area has a housing centroid, and wherein the rotation axis of the rotatable selector is at or substantially at the housing centroid.

17. A thermostat having a thermostat housing, comprising:
   a rotatable selector having a range of rotatable positions, wherein a desired parameter value is identified by the position of the rotatable selector along the range of rotatable positions, the rotatable selector being rotatable about a rotation axis;
   a potentiometer coupled to the rotatable selector; and
   a non-rotating element at least partially overlapping the rotatable selector, the non-rotating element fixed relative to the thermostat housing via one or more support member, the one or more support member being laterally displaced relative to the rotation axis of the rotatable selector.

18. A thermostat according to claim 17, wherein the rotatable selector includes a shaft or is coupled to a shaft that extends along the rotation axis.

19. A thermostat according to claim 17 wherein the rotatable selector has a front face and a back face, and wherein the non-rotating element overlaps at least a portion of the front face of the rotatable selector.

20. A thermostat according to claim 19, wherein the non-rotating element overlaps the rotatable selector to an extent such that at least part of the non-rotating element intersects the rotation axis of the rotatable selector.

21. A thermostat according to claim 17 wherein the rotatable selector has a front face and a back face, and wherein the non-rotating element overlaps at least a portion of the back face of the rotatable selector.

22. A thermostat having a thermostat housing, comprising:
   a rotatable selector having a front face, and further having a range of rotatable positions, wherein a desired parameter value is identified by the position of the rotatable selector along the range of rotatable positions, the rotatable selector being rotatable about a rotation axis; and
   a non-rotating element at least partially overlapping the front face of the rotatable selector, the non-rotating element fixed relative to the thermostat housing via one or more support member, the one or more support member being laterally offset relative to the rotation axis of the rotatable selector, wherein the one or more support member extends through an opening or slot in the rotatable selector.

23. A thermostat according to claim 22, wherein the rotatable selector rotates in an arc about the rotation axis of the rotatable selector.

24. A thermostat having a thermostat housing and a user interface, wherein the user interface is adapted to allow a user's hand to adjust at least one parameter value of the thermostat, the thermostat comprising:
   a rotatable selector having a front face, and further having a range of rotatable positions, wherein a desired parameter value is identified by the position of the rotatable selector along the range of rotatable positions, the rotatable selector being rotatable about a rotation axis; and
   a non-rotating element at least partially overlapping the front face of the rotatable selector, the non-rotating element fixed relative to the thermostat housing via one or more support member, wherein the rotatable selector is accessible and rotatable directly by the user's hand.

25. A thermostat according to claim 24, wherein the non-rotating element comprises a temperature indicator.

26. A thermostat according to claim 25, wherein the mechanical to electrical translator is a potentiometer.

27. A thermostat according to claim 26, wherein the potentiometer is disposed along the rotation axis of the rotatable selector.

28. A thermostat according to claim 26, further comprising a circuit board that is fixed relative to the thermostat housing, and wherein the potentiometer is mounted to the circuit board.

29. A thermostat according to claim 24, wherein the rotatable selector is coupled to a mechanical to electrical translator.

30. A thermostat having a thermostat housing, comprising:
   a rotatable selector having a front surface and a back surface, and further having a range of rotatable positions, wherein a desired parameter value is identified by the position of the rotatable selector along the range of rotatable positions, the rotatable selector being rotatable about a rotation axis;
   a non-rotating element at least partially overlapping the back surface of the rotatable selector, the non-rotating element fixed relative to the thermostat housing, the non-rotating element having one or more support members extending through an opening or slot in the rotatable selector; and
   a housing having an aperture therein, wherein the aperture is adapted to accept the rotatable selector.

* * * * *